Jan. 7, 1941.　　　　　E. MARTIN　　　　2,227,942
VIBRATION ABSORBING DEVICE
Filed Nov. 2, 1938　　　2 Sheets-Sheet 1

INVENTOR.
Erle Martin
BY Harris G. Luther
ATTORNEY

Jan. 7, 1941.   E. MARTIN   2,227,942
VIBRATION ABSORBING DEVICE
Filed Nov. 2, 1938   2 Sheets-Sheet 2

INVENTOR.
Erle Martin
BY Harris G. Luther
ATTORNEY

Patented Jan. 7, 1941

2,227,942

UNITED STATES PATENT OFFICE 2,227,942

VIBRATION ABSORBING DEVICE

Erle Martin, West Hartford, Conn., assignor to United Aircraft Corporation, East Hartford, Conn., a corporation of Delaware Application November 2, 1938, Serial No. 238,336

6 Claims. (Cl. 74—604)

This invention relates to improvements in vibration absorbing devices and has for an object the provision of an improved vibration absorbing arrangement for a power plant such as an internal combustion engine.

A further object resides in the provision of an improved vibration absorbing construction of the character indicated which utilizes certain elements of the power plant for its vibration absorbing action to absorb or reduce the vibrational effects set up by the power plant with a minimum of additional parts.

Other objects and advantages will be more particularly pointed out hereinafter or will become apparent as the description proceeds.

In the accompanying drawings, in which like reference numerals are used to designate similar parts throughout, there is illustrated by way of example, a suitable mechanical embodiment of the invention. The drawings, however, are for the purpose of illustration only and are not to be taken as in any way limiting or restricting the scope of the invention as set out in the appended claims.

Figure 1:
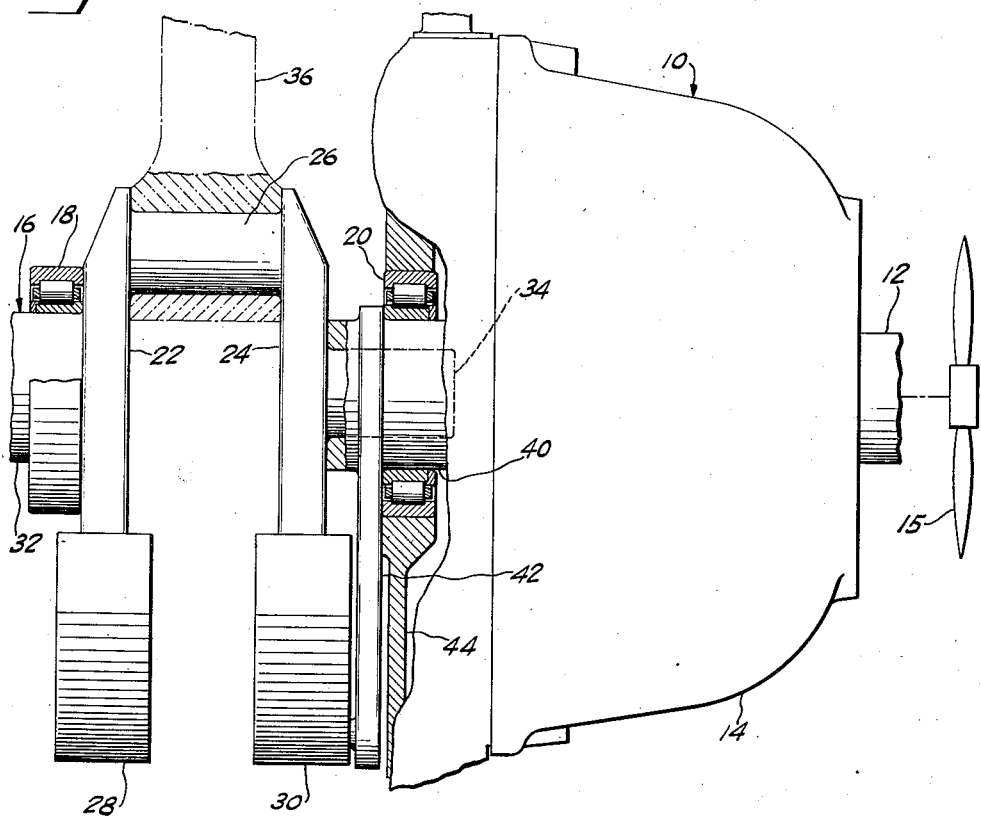
Fig. 1 is an elevational view of a fragmentary portion of an internal combustion engine, a portion thereof being broken away and shown in section to better illustrate the application thereto of a vibration absorbing arrangement constructed according to the invention.

Referring to the drawings in detail, the numeral 10 generally indicates a powerplant such as an internal combustion engine. A radial type of internal combustion engine such as is conventionally employed for the propulsion of aircraft has been illustrated for the purpose of disclosing the invention but it is to be understood that the invention is in no way limited to this particular form of engine and may find practical application in powerplants other than internal combustion engines. In the arrangement illustrated a drive shaft 12 projects from the front end or nosepiece 14 of the engine and may support and drive a propulsive device such as the aeronautical propeller 15 schematically shown on a reduced scale. The engine is provided with a crankshaft generally indicated at 16 mounted in spaced main bearings 18 and 20 and operatively connected with the drive shaft 12 either directly or through some suitable form of reduction gear mounted in the nosepiece 14. The crankshaft 16, as illustrated, includes a pair of crank cheeks 22 and 24 united by a crankpin 26 and carrying at their ends opposite the crankpin counterweights as indicated at 28 and 30. Bearing portions as indicated at 32 and 34 are provided on the outer faces of the respective crank cheeks 22 and 24 to rotatably support the crankshaft in the engine. A connecting rod or master rod 36 is operatively associated with the crankpin 26 at one end by means of a suitable crank bearing and is operatively connected at its opposite end with the usual engine piston. The construction so far described is conventional internal combustion engine construction familiar to those skilled in the art and constitutes only an environment for the improved vibration absorber which will now be described.

Figure 3:
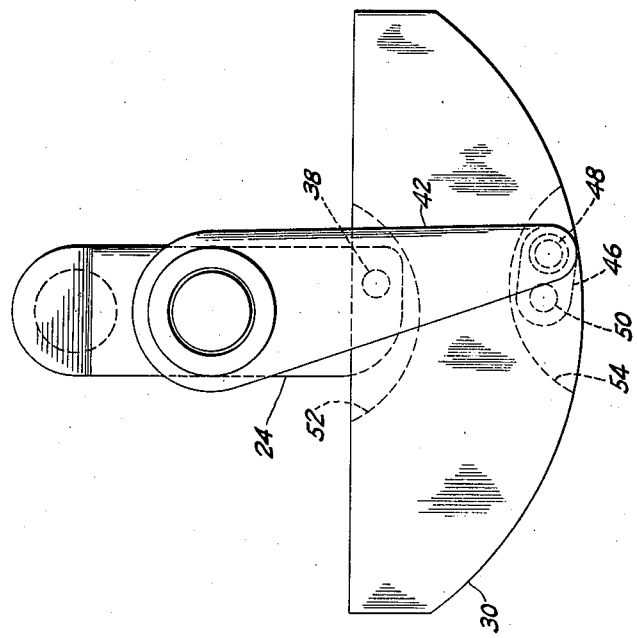
Figure 2:
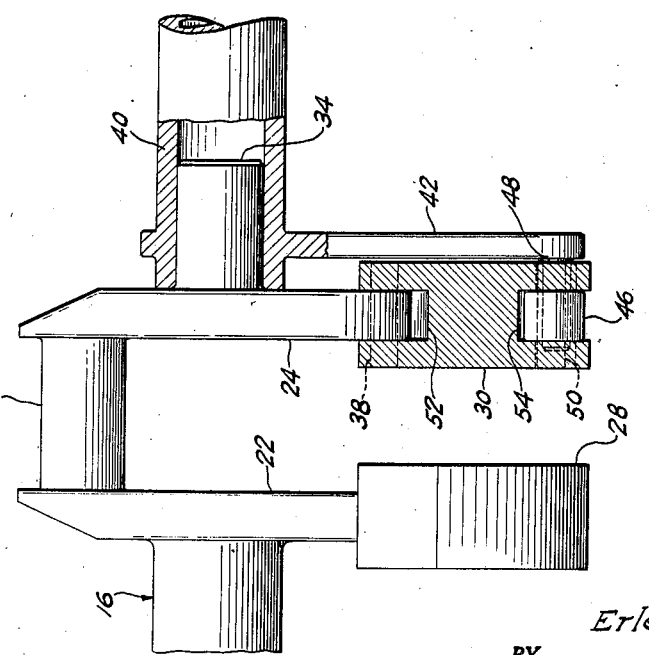
Fig. 2 is an elevational view of the crankshaft of the engine shown in Fig. 1 showing in vertical section the application thereto of a vibration absorbing device constructed according to the invention and, Fig. 3 is an end elevational view of the crankshaft and vibration absorbing device illustrated in Fig. 2.

One of the counterweights, for example the front counterweight 30, is made separate from the corresponding crank cheek 24 and is pivotally secured to the crank cheek by suitable means such as the pivot pin 38 particularly illustrated in Figs. 2 and 3. As is clearly shown in Fig. 3 this pivot pin is located at a distance from the center lines of the crank cheek and counterweight for a purpose which will presently appear. A sleeve 40 surrounds the forward crankshaft main bearing journal 34 and is supported in the engine main bearing 20 and operatively connected with the drive shaft 12. This sleeve is provided with a radially extending arm 42 adapted to rotate in the space between the counterweight 30 and the transverse engine partition 44 which supports the main bearing 20. At its outer end this arm is pivotally connected to the outer portion of the counterweight 30 by means of the link 46 which is pivotally connected at one end to the outer end of the arm 42 by the pivot pin 48 and at its outer end to the outer portion of the counterweight 30 by the pivot pin 50. The counterweight may conveniently be provided with indentations or cavities as indicated at 52 and 54 for the end of the crank cheek 24 and for the link 46 respectively.

In operation as the crankshaft 16 is rotated centrifugal force tends to hold the pivotally mounted counterweight 30 in a position in which its center of mass is the greatest possible distance from the pivot pin 38. As the pivot pin 38 is somewhat off center with respect to the counterweight, the centrifugal force acting upon the counterweight will tend to turn the counterweight so that its center line intersects the center line of the crank cheek 24 at an angle. As the sleeve 40 is freely rotatable with respect to the front bearing portion 34 of the crankshaft all of the engine torque is transmitted from the crankshaft 16 to the drive shaft 12 through the crank cheek 24, the counterweight 30, the arm 42 and the sleeve 40. The pivot pin 38 is offset from the center of the counterweight 30 in the direction of rotation of the crankshaft so that the torque forces acting between the outer portion of the counterweight and the outer end of the arm 42 tends to move the counterweight back against the action of centrifugal force to its normal position in which the center line of the counterweight is substantially coincident with the center line of the crank cheek 24, or an extension thereof. As the torque force transmitted from the crankshaft to the drive shaft varies because of the imposition thereon of vibrational effects originating in the engine 10, the counterweight will rock to a limited extent about the pivot pin 38 to provide a limited freedom of rotational movement between the crankshaft and the sleeve 40 which drives the drive shaft 12. This limited freedom of relative rotational movements is resiliently resisted by the centrifugal force acting upon the counterweight so that the counterweight, in addition to serving as a primary balance for the crankpin 26 and big end of the connecting rod or master rod 36 also acts as a centrifugal cushion element to dampen the vibration set up by the engine and oppose the transmission of such vibration from the crankshaft to the drive shaft and the propeller or other propulsive device connected with the drive shaft.

Either the entire counterweight 30 or any portion thereof may be pivotally mounted to serve as a vibration absorbing element and, by properly proportioning the mass of the movable counterweight element and by properly positioning the pivots 38, 48 and 50 the vibration absorber may be designed to dampen a particularly objectionable vibration order to effectively eliminate the selected order of vibrational frequency from the combination of vibrational harmonics set up by the engine.

While a particular mechanical embodiment of the invention has been illustrated and described for the purpose of disclosing the invention it is to be understood that the invention is not limited to the particular arrangement so illustrated and described but that changes in the size, shape and arrangement of parts may be resorted to as come within the scope of the sub-joined claims.

Having now described the invention so that others skilled in the art may clearly understand the same, what is claimed and what it is desired to secure by Letters Patent is as follows:

1. In combination with an engine having a crankshaft, a vibration absorber comprising, a crankshaft counterweight, means for pivotally supporting said counterweight, a torque transmitting element freely rotatable relative to said crankshaft, and a torque transmitting connection between said pivotally mounted counterweight and said torque transmitting element.

2. In combination with an engine having a crankshaft, a vibration absorber comprising, a crankshaft counterweight, means for pivotally supporting said counterweight, a torque transmitting element freely rotatable with respect to said crankshaft, a radially extending arm on said torque transmitting element, and means providing a pivotal connection between the outer end of said arm and said pivotally mounted counterweight.

3. In combination with an engine having a crankshaft, a vibration absorber comprising, a crankshaft counterweight, a pivotal connection between said counterweight and said crankshaft offset from the center line of said counterweight in the direction of crankshaft rotation, a torque transmitting element freely rotatable relative to said crankshaft, a radially extending arm on said torque transmitting element, and means providing a pivotal connection between the outer end of said arm and the outer portion of said pivotally mounted counterweight.

4. In combination with an engine having a crankshaft, a vibration absorber comprising, a crankshaft counterweight, means for pivotally supporting said counterweight on said crankshaft, a torque transmitting sleeve element supporting one end of said crankshaft and rotatable relative thereto, a radially extending arm on said sleeve element, and means providing a pivotal connection, between the outer end of said arm and the outer portion of said pivotally mounted counterweight.

5. In combination with an engine having a plurality of rotating elements including a crankshaft and a separate power shaft, a vibration suppressing connection between said shafts comprising at least one pair of radial arms and a centrifugally actuated weight connecting the outer ends of said arms, said weight and at least one of said arms also functioning as rotatable elements of said engine.

6. In an internal combustion engine, a crankshaft having a radially extending counterweight support, a counterweight pivotally connected on the crankshaft side of its center of gravity to the end of said support, a power transmitting member coaxial with said crankshaft and having an arm extending radially therefrom, and a pivotal connection between said arm and said counterweight on the side of said first mentioned pivotal connection remote from said crankshaft, whereby said counterweight acts to balance said crankshaft and to simultaneously provide a part of a vibration suppressing connection between said crankshaft and said torque transmitting member.

ERLE MARTIN.